(12) United States Patent
Takahashi (10) Patent No.: US 8,965,684 B2
(45) Date of Patent: Feb. 24, 2015

(54) MOBILE TERMINAL, SYSTEM AND METHOD (75) Inventor: Makoto Takahashi, Chiyoda-ku (JP)

(73) Assignee: NTT DOCOMO, INC., Tokyo (JP)

(*) Notice: Subject to any disclaimer, the term of this patent is extended or adjusted under 35 U.S.C. 154(b) by 5 days.

(21) Appl. No.: 13/880,988

(22) PCT Filed: Nov. 28, 2011

(86) PCT No.: PCT/JP2011/077408
§ 371 (c)(1),
(2), (4) Date: Apr. 23, 2013

(87) PCT Pub. No.: WO2012/073897
PCT Pub. Date: Jun. 7, 2012

(65) Prior Publication Data
US 2013/0211709 A1 Aug. 15, 2013

(30) Foreign Application Priority Data

Dec. 2, 2010 (JP) ................. 2010-269610

(51) Int. Cl.
G01C 21/00 (2006.01)
G01C 21/12 (2006.01)
(Continued)

(52) U.S. Cl.
CPC ............. *G01C 21/00* (2013.01); *G01C 21/30* (2013.01); *G01S 19/40* (2013.01); *G01S 19/48* (2013.01);
(Continued)

(58) Field of Classification Search
CPC .... G01C 21/3415; G01C 21/34; G01C 21/20; G01C 21/30; G01C 21/3641; G01C 21/005; G08G 1/096844; G08G 1/005; G01S 5/0252; G05D 1/0274; B60R 25/33
See application file for complete search history.

(56) References Cited

U.S. PATENT DOCUMENTS 5,367,463 A 11/1994 Tsuji
6,240,363 B1 * 5/2001 Theimer et al. ............... 701/412
(Continued)

FOREIGN PATENT DOCUMENTS

EP 1867951 A1 * 12/2007
JP 5 18774 1/1993
(Continued)

OTHER PUBLICATIONS

International Search Report Issued Feb. 28, 2012 in PCT/JP11/77408 Filed Nov. 28, 2011.

*Primary Examiner* — James Trammell
*Assistant Examiner* — Demetra Smith-Stewart
(74) *Attorney, Agent, or Firm* — Oblon, Spivak, McClelland, Maier & Neustadt, L.L.P.

(57) ABSTRACT

The present invention pertains to a mobile terminal having an autonomous navigation function, said mobile terminal comprising: a map application which performs map matching on the current position of the mobile terminal on a route to a destination; a measurement unit which detects the movement of the mobile terminal, and which provides sensor information representing the number of steps and travel direction; a position calculation unit which determines the current position of the mobile terminal; a travel direction correction unit which, when it has been estimated that a user is walking straight by determining whether the amount of change of the user's travel direction is within a prescribed range in a prescribed period, corrects the user's travel direction according to the orientation of the straight parts when the user is walking straight on the route; and a current position correction unit which, on the basis of the corrected travel direction and the starting time and starting point when walking straight, recalculates the current position of the mobile terminal from the starting point, and corrects the current position of the mobile terminal according to the recalculated current position.

8 Claims, 3 Drawing Sheets (51) Int. Cl.
*G01C 21/30* (2006.01)
*G01S 19/40* (2010.01)
*G01S 19/48* (2010.01)
*G08G 1/005* (2006.01)
*G08G 1/0968* (2006.01)
*G01C 21/16* (2006.01)
*G01C 21/20* (2006.01)

(52) U.S. Cl.
CPC .......... *G08G 1/005* (2013.01); *G08G 1/096827* (2013.01); *G01C 21/16* (2013.01); *G01C 21/206* (2013.01)
USPC .......... 701/417; 701/411; 701/472; 701/495; 701/502; 702/92; 702/141; 702/150

(56) References Cited

U.S. PATENT DOCUMENTS

| | | | |
|---|---|---|---|
| 6,249,740 B1 | 6/2001 | Ito et al. | |
| 6,546,336 B1 * | 4/2003 | Matsuoka et al. | 701/472 |
| 6,813,582 B2 * | 11/2004 | Levi et al. | 702/141 |
| 6,826,477 B2 * | 11/2004 | Ladetto et al. | 701/472 |
| 8,207,869 B1 * | 6/2012 | Judd et al. | 340/995.23 |
| 8,391,888 B2 * | 3/2013 | Hanada et al. | 455/456.1 |
| 8,694,251 B2 * | 4/2014 | Janardhanan et al. | 701/512 |
| 8,758,275 B2 * | 6/2014 | Kourogi et al. | 600/595 |
| 2007/0276597 A1 * | 11/2007 | Kato et al. | 701/211 |
| 2009/0192708 A1 * | 7/2009 | Yoo et al. | 701/213 |
| 2009/0271109 A1 * | 10/2009 | Lee et al. | 701/208 |
| 2010/0245174 A1 * | 9/2010 | Okuyama et al. | 342/451 |
| 2011/0054836 A1 * | 3/2011 | Foxlin | 702/150 |
| 2011/0106487 A1 * | 5/2011 | Kourogi | 702/142 |
| 2012/0086606 A1 * | 4/2012 | Mathews et al. | 342/461 |

FOREIGN PATENT DOCUMENTS

| | | |
|---|---|---|
| JP | 5 46085 | 2/1993 |
| JP | 2000 97722 | 4/2000 |
| JP | 2000 113388 | 4/2000 |
| JP | 2004 212131 | 7/2004 |
| JP | 2007 41143 | 2/2007 |
| JP | 2009 75036 | 4/2009 |
| JP | 2010 9242 | 1/2010 |

* cited by examiner

FIG.1

MOBILE TERMINAL, SYSTEM AND METHOD

TECHNICAL FIELD

The present invention relates to a mobile terminal having an autonomous navigation function.

BACKGROUND ART

Recently, development of positional information services in indoor environments is expected due to improvement of accuracy of positioning techniques using base stations and emergence of new positioning techniques such as a WLAN (Wireless Local Area Network) positioning technique for mobile terminals.

As one of the new indoor positioning techniques, attention to an autonomous navigation technique using various sensor information items from an accelerometer sensor, a geomagnetic sensor and others has been drawn. However, there is a problem that errors of measurement using only sensors may be accumulated, and it is important to perform positional correction periodically by using information items other than the sensor information items so as to improve the accuracy. For example, see JP 2007-41143 and JP 2000-97722.

SUMMARY OF INVENTION

Problem to be Solved by the Invention

In a conventional autonomous navigation targeted to mobile terminals, an accelerometer sensor, a geomagnetic sensor, a gyro sensor and others are used to measure the position of the mobile terminals by estimating an amount of movement from an initial position and calculating positional coordinates.

However, if an estimation error of a rotational angle arises in turning at a corner, the estimation error leads to an error of the travelling direction. Even if map matching is performed arbitrarily to eliminate this problem, the current position is temporarily updated to an appropriate position on a route or others, but the travelling direction recognized by the mobile terminal itself may generally include the estimation error and remain unchanged. Accordingly, if the user further walks, the mobile terminal would recognize the erroneous current position again, which causes additional map matching. As a result, the movement path is recorded in a saw-toothed form, which results in a deviation between the walking distance and the actual movement amount and compounds the error of the walking distance.

In conjunction with the above problem, one object of the present invention is to provide a mobile terminal, a system and a method that use map information for correction of the travelling direction to eliminate accumulation of estimation errors of the travelling direction in the mobile terminal having an autonomous navigation function.

Means for Solving the Problem

In order to overcome the above problem, one aspect of the present invention relates to a mobile terminal having an autonomous navigation function including a map application unit configured to perform map matching of a current position of the mobile terminal onto a route from a departure point to a destination point of a user of the mobile terminal in map information, a measurement unit configured to detect movement of the mobile terminal and provide sensor information indicative of a number of steps and a travelling direction of the user, a position calculation unit configured to determine the current position of the mobile terminal based on the number of steps and the travelling direction of the user in the sensor information, a travelling direction correction unit configured to estimate whether the user is in a straight walking state by determining whether a change amount of the travelling direction of the user in the sensor information is within a predefined range for a predefined time period, if estimating that the user is in the straight walking state, the travelling direction correction unit correcting the travelling direction of the user with a direction of a straight portion of the route in the straight walking state, and a current position correction unit configured to recalculate the current position of the mobile terminal from a start point based on the corrected travelling direction as well as a start time point and the start point of the straight walking state and correct the current position of the mobile terminal with the recalculated current position.

Another aspect of the present invention relates to a system including a mobile terminal having an autonomous navigation function and a server communicatively connected to the mobile terminal, the server performing map matching of a current position of the mobile terminal onto a route from a departure point to a destination point of a user of the mobile terminal in map information and indicating the map matched position on the route to the mobile terminal, the mobile terminal including a measurement unit configured to detect movement of the mobile terminal and provide sensor information indicative of a number of steps and a travelling direction of the user, a position calculation unit configured to determine the current position of the mobile terminal based on the number of steps and the travelling direction of the user in the sensor information, a travelling direction correction unit configured to estimate whether the user is in a straight walking state by determining whether a change amount of the travelling direction of the user in the sensor information is within a predefined range for a predefined time period, if estimating that the user is in the straight walking state, the travelling direction correction unit correcting the travelling direction of the user with a direction of a straight portion of the route in the straight walking state indicated from the server, and a current position correction unit configured to recalculate the current position of the mobile terminal from a start point based on the corrected travelling direction as well as a start time point and the start point of the straight walking state and correct the current position of the mobile terminal with the recalculated current position.

A further aspect of the present invention relates to a method for use in a mobile terminal having an autonomous navigation function including performing map matching of a current position of the mobile terminal onto a route from a departure point to a destination point of a user of the mobile terminal in map information, detecting movement of the mobile terminal and providing sensor information indicative of a number of steps and a travelling direction of the user, determining the current position of the mobile terminal based on the number of steps and the travelling direction of the user in the sensor information, estimating whether the user is in a straight walking state by determining whether a change amount of the travelling direction of the user in the sensor information is within a predefined range for a predefined time period, if estimating that the user is in the straight walking state, correcting the travelling direction of the user with a direction of a straight portion of the route in the straight walking state, and recalculating the current position of the mobile terminal from a start point based on the corrected travelling direction as well as a start time point and the start point of the straight walking state and correcting the current position of the mobile terminal with the recalculated current position.

Advantage of the Invention

According to the present invention, it is possible to provide a mobile terminal, a system and a method that use map information for correction of the travelling direction to eliminate accumulation of estimation errors of the travelling direction in the mobile terminal having an autonomous navigation function.

EMBODIMENTS FOR CARRYING OUT THE INVENTION

Embodiments of the present invention are described below with reference to the drawings.

A mobile terminal according to embodiments of the present invention estimates a straight walking state from sensor information and corrects the travelling direction estimated from the sensor information with the direction of a setup route on a map. If the travelling direction is corrected, the mobile terminal recalculates a movement amount from a start point of the straight walking and corrects the current position.

Initially, an arrangement of a mobile terminal according to one embodiment of the present invention is described with reference to FIG. 1.

A mobile terminal according to this embodiment is typically a portable information terminal, such as a cellular phone terminal or a smart phone, that can acquire position of the mobile terminal by means of an application installed in the mobile terminal or information from an external device that can communicate via a network (not shown). Typically, the mobile terminal consists of one or more various hardware resources such as an auxiliary storage device, a memory device, a CPU, a communication device, a display device, an input device and a measurement device. The auxiliary storage device consists of a hard disk, a flash memory or others and stores programs or data for implementing various operations as stated below. The memory device consists of a RAM (Random Access Memory) or others and in response to receipt of an instruction to start the programs, reads the programs from the auxiliary storage device and loads the programs therein. The CPU serves as a processor for processing information and implements various functions as stated below in accordance with the programs stored in the memory device. The communication device consists of various communication circuits for wired and/or wireless connections with other devices such as a server via a network. The communication device according to this embodiment further includes a reception circuit for implementing a GPS (Global Positioning System) function. The display device consists of a display or others and displays contents received via the network or a GUI (Graphical User Interface) in accordance with programs.

The input device typically consists of operation buttons, a keyboard, a mouse or others and is used for a user of the mobile terminal to input various manipulation commands. The measurement device consists of various sensors, such as an accelerometer sensor, a geomagnetic sensor and a gyro sensor, to measure movement of the mobile terminal for implementing the autonomous navigation function. Note that the mobile terminal of the present invention is not limited to the above hardware arrangement and may include any other appropriate hardware arrangement such as circuits or others for implementing various functions as stated below.

Figure 1:
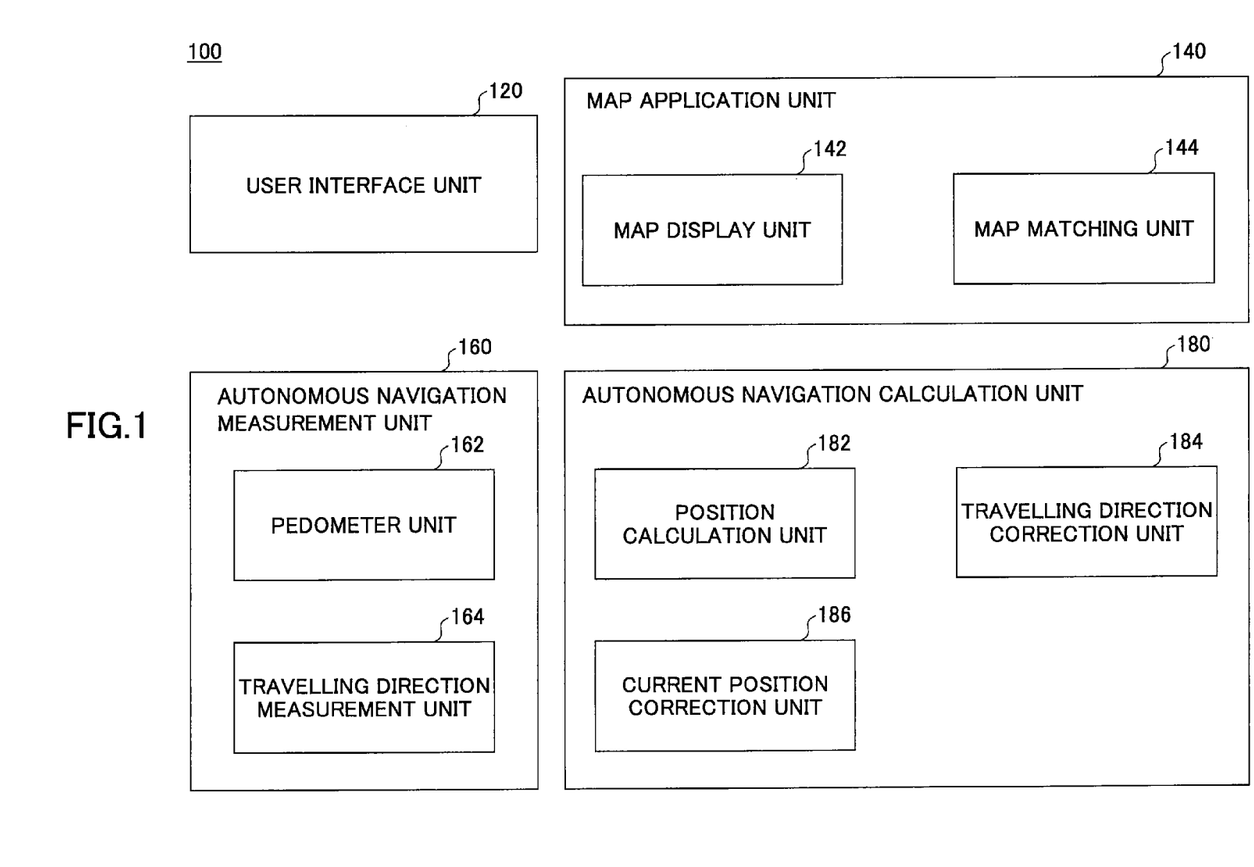
FIG. 1 illustrates an exemplary functional arrangement of a mobile terminal according to one embodiment of the present invention.

FIG. 1 illustrates an exemplary function arrangement of a mobile terminal according to one embodiment of the present invention. In FIG. 1, a mobile terminal 100 includes a user interface unit 120, a map application unit 140, an autonomous navigation measurement unit 160 and an autonomous navigation calculation unit 180.

When a user inputs a departure point and a destination point via the input device, the user interface unit 120 provides the map application unit 140 with positional information on the supplied departure and destination points. Typically, the departure point is a current position, and the positional information on the current position acquired by means of the GPS function in the mobile terminal 100 may be supplied to the map application unit 140. Also, the destination point may be an address of the user's input destination point, a point specified on map information displayed by the map application unit 140, or a building, a facility or a store specified via other applications, and the positional information derived from the specified position may be supplied to the map application unit 140.

Upon receiving the positional information regarding the departure and destination points from the user interface unit 120, the map application unit 140 sets a route from the specified departure point to the specified destination point and when the current position of the mobile terminal 100 calculated by the autonomous navigation calculation unit 180 deviates from the setup route, uses any appropriate map matching technique to correct the current position of the mobile terminal 100 onto the setup route.

As illustrated in FIG. 1, the map application unit 140 includes a map display unit 142 and a map matching unit 144.

The map display unit 142 sets a route from the departure point to the destination point based on the positional information on the departure and destination points supplied from the user interface unit 120 and provides the map matching unit 144 with the setup route. The setting of a route may be performed by determining the route from the departure point to the destination point by using any appropriate navigation algorithm with reference to the map information stored in the map application unit 140. Typically, the shortest route from the departure point to the destination point is selected, but the setting of a route is not limited to it. The route may be set in any appropriate method. Upon setting the route from the departure point to the destination point, the map display unit 142 generates map data for display in order to display the setup route to the user. If there are several candidate routes from the departure point to the destination point, the map display unit 142 may generate map data for display for one route selected from the several routes as the route for display and provide the user interface unit 120 with the generated map data for display. Also, the map display unit 142 may provide the map matching unit 144 with the other routes as candidate routes, although the map display unit 142 does not generate map data for display for the other routes.

The map matching unit 144 uses any appropriate map matching technique to correct the current position of the mobile terminal 100 calculated by the autonomous navigation calculation unit 180 based on the sensor information. Specifically, upon receiving the setup route from the map display unit 142, the map matching unit 144 reviews the setup route with reference to map information stored in the map application unit 140. Then, the map matching unit 144 periodically receives the current position of the mobile terminal 100 calculated by the autonomous navigation calculation unit 180 based on the sensor information and determines whether the received current position deviates from the setup route. If the received current position deviates from the setup route, the map matching unit 144 uses any appropriate map matching technique to correct the current position by mapping the current position of the mobile terminal 100 onto the setup route. Then, the map matching unit 144 provides the autonomous navigation calculation unit 180 with the corrected current position.

In this embodiment, the map application unit 140 is installed within the mobile terminal 100, but the present invention is not limited to it. In another embodiment, the map application unit 140 may be installed in an external server that can communicate with the mobile terminal 100. In other words, when the user interface unit 120 sends the server the positional information regarding the user's incoming departure and destination points, the server may perform the above-stated operations and determine the setup route of the mobile terminal 100. When the server corrects the current position that is calculated by the mobile terminal 100 and is periodically transmitted from the mobile terminal, the server may return the post-corrected current position to the mobile terminal 100.

The autonomous navigation measurement unit 160 measures various data regarding movement of the mobile terminal 100 and provides the autonomous navigation calculation unit 180 with the measured data as sensor information. As illustrated in FIG. 1, the autonomous calculation measurement unit 160 includes a pedometer unit 162 and a travelling direction measurement unit 164.

The pedometer unit 162 monitors walking of a user carrying the mobile terminal 100 and measures the number of steps the user has taken. The pedometer unit 162 can be typically implemented by an accelerometer sensor but is not limited to it. The pedometer unit 162 may be implemented by any other appropriate device that can measure the number of the user's steps or the walking distance.

The travelling direction measurement unit 164 monitors walking of a user carrying the mobile terminal 100 and detects the travelling direction of the user's walking. The travelling direction measurement unit 164 can be typically implemented by a geomagnetic sensor or a gyro sensor, but is not limited to it. The travelling direction measurement unit 164 may be implemented by any other appropriate device that can measure the travelling direction of the user.

The autonomous navigation measurement unit 160 provides the autonomous navigation calculation unit 180 with the number of the user's steps measured by the pedometer measurement unit 162 and the user's travelling direction measured by the travelling direction measurement unit 164 as sensor information. The sensor information may be supplied to the autonomous navigation calculation unit 180 at any appropriate timing such as in response to a request from the autonomous navigation calculation unit 180 or others, in response to the start of the user's walking or on a periodic basis.

Upon acquiring the sensor information such as the number of the user's steps and the travelling direction of the mobile terminal 100 measured by the autonomous navigation measurement unit 160, the autonomous navigation calculation unit 180 calculates the current position of the mobile terminal 100 based on the sensor information and provides the map application unit 140 with the calculated current position. As stated above, if the calculated current position deviates from the setup route, the map application unit 140 corrects the received current position calculated by the autonomous navigation calculation unit 180 and sends back the corrected current position to the autonomous navigation calculation unit 180. Upon receiving the corrected current position, the autonomous navigation calculation unit 180 corrects the calculated current position. In addition, the autonomous navigation calculation unit 180 estimates a straight walking state based on the user's travelling direction measured by the autonomous navigation measurement unit 160. When the autonomous navigation calculation unit 180 estimates that the user is walking straight, the autonomous navigation calculation unit 180 corrects the travelling direction currently setup in the autonomous navigation calculation unit 180 based on the direction derived from positions of two points corrected in accordance with map matching. If the travelling direction is corrected in this manner, the autonomous navigation calculation unit 180 further uses the post-corrected travelling direction and the number of steps supplied from the autonomous navigation measurement unit 160 to recalculate the current position from the start point of the straight walking state.

As illustrated in FIG. 1, the autonomous navigation calculation unit 180 includes a position calculation unit 182, a travelling direction correction unit 184 and a current position correction unit 186.

The position calculation unit 182 calculates a movement amount of the mobile terminal 100 during autonomous navigation based on the sensor information supplied from the autonomous navigation measurement unit 160, determines the current position of the mobile terminal 100 by adding the calculated movement amount to a current setup reference point and provides the map application unit 140 with the positional information, such as the longitude and the latitude, of the determined current position. Specifically, the position calculation unit 182 uses the measured number of the user's steps and the measured travelling direction in the sensor information to derive the walking distance by multiplying the length of the user's stride (typically, a subtraction of 1 m from the user's input height) with the measured number of steps and calculate the movement amount from the reference point based on the derived walking distance and the measured travelling direction. The position calculation unit 182 initially sets the latitude and the longitude of the departure point of the setup route as the reference point and finds the distance and direction of the movement from the reference point based on the walking distance estimated from the number of the user's steps and the course of travelling direction. Subsequently, whenever the current position correction unit 186 corrects the current position of the mobile terminal 100, the position calculation unit 182 renews the reference point with the post-corrected position and calculates the movement amount from the renewed reference point. In addition, upon receiving the corrected travelling direction from the travelling direction correction unit 184, the position calculation unit 182 resets the current setup travelling direction with the received travelling direction for use in subsequent position calculation.

The travelling direction correction unit 184 monitors the travelling direction of the mobile terminal 100 supplied from the autonomous navigation measurement unit 160 and when the travelling direction remains unchanged, estimates that the user is in the straight walking state. When the straight walking state is detected, the travelling direction correction unit 184 determines that the user is walking on a straight portion of the setup route and corrects the current setup travelling direction with the direction of the straight portion in map information in the map application unit 140. After correcting the travelling direction, the travelling direction correction unit 184 transmits the corrected travelling direction as well as the start point and the start time point of the straight walking state to the position calculation unit 182 and the current position correction unit 186.

Whenever the map application unit 140 corrects the current position or whenever the travelling direction correction unit 184 corrects the travelling direction, the current position correction unit 186 corrects the current position of the mobile terminal 100. Specifically, when the map application unit 140 corrects the current position and indicates the corrected position after map matching to the current position correction unit 186, the current position correction unit 186 corrects the current position of the mobile terminal 100 calculated by the position calculation unit 182 with the indicated position after the map matching. Also, when the travelling direction correction unit 184 corrects the travelling direction and indicates the post-corrected travelling direction as well as the start point and the start time point of the straight walking state to the current position correction unit 186, the current position correction unit 186 recalculates the movement amount of the mobile terminal 100 from the start point of the straight walking state and corrects the current position based on the post-corrected travelling direction and the number of steps from the start time point of the straight walking state. After correcting the current position, the current position correction unit 186 transmits the corrected current position to the position calculation unit 182. The transmitted current position after correction is used as a reference point for subsequently calculating the current position of the mobile terminal 100.

Figure 2:
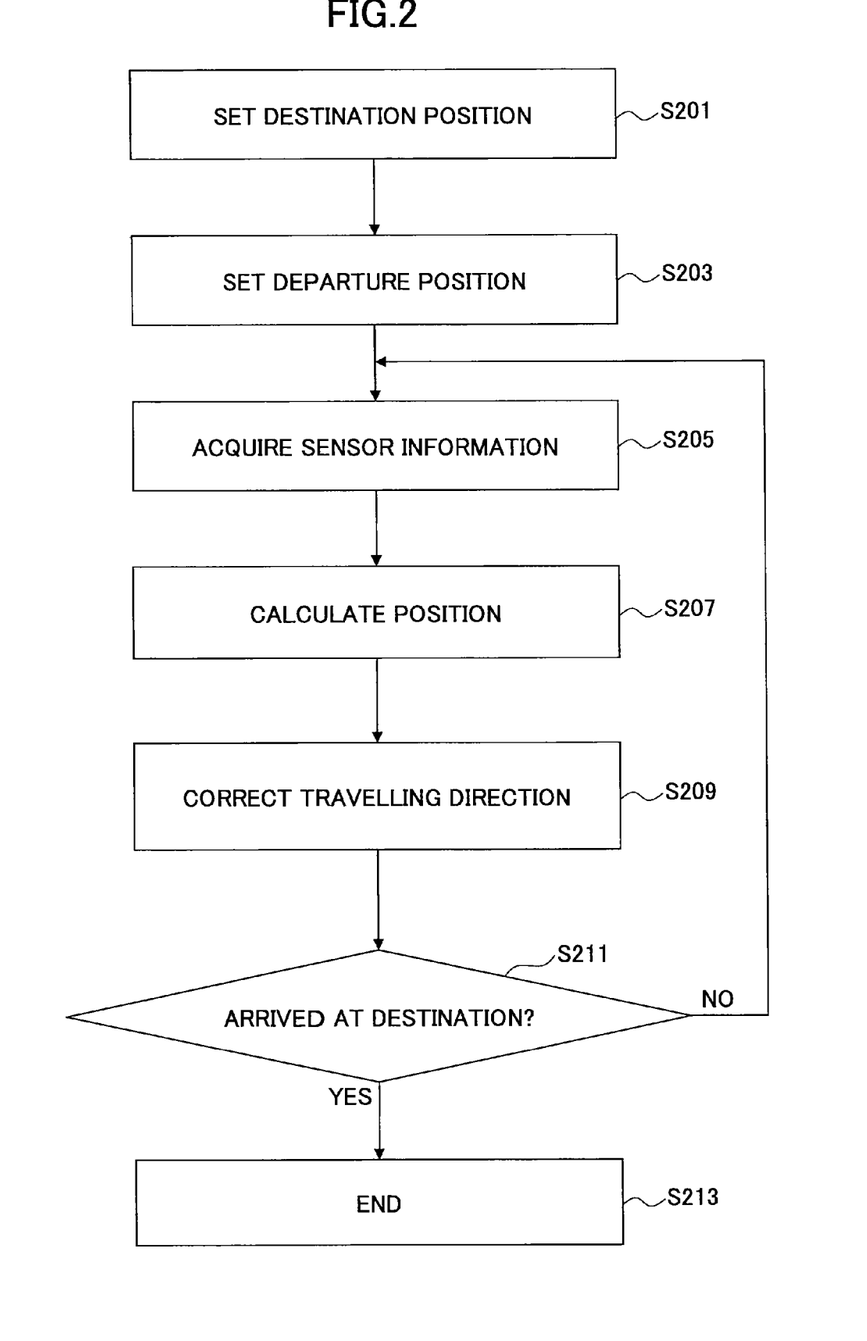
FIG. 2 is a flowchart illustrating an exemplary autonomous navigation operation in a mobile terminal according to one embodiment of the present invention.

Next, an exemplary operation of a mobile terminal according to one embodiment of the present invention is described with reference to FIG. 2. FIG. 2 is a flowchart illustrating an exemplary autonomous navigation operation in a mobile terminal according to one embodiment of the present invention.

As illustrated in FIG. 2, at step S201, a user sets a destination point to the user interface unit 120 via an input device of the mobile terminal 100. As stated above, the user may set the destination point by inputting an address of the destination. Also, the user may set the destination point by specifying a point on the map information displayed by the map application unit 140 on a display device of the mobile terminal 100. Also, the user may set the destination point by specifying a building, a facility, a store or others displayed via other applications.

At step S203, the user sets a departure point to the user interface unit 120 via the input device of the mobile terminal 100. Typically, the departure point may be set to the current position by default. On the other hand, the user may set a specific departure point different from the current position via the input device of the mobile terminal 100. For example, the user may set the departure point by inputting an address of the departure point. Also, the user may set the departure point by specifying a point on the map information displayed by the map application unit 140 on a display device of the mobile terminal 100. Also, the user may set the departure point by specifying a building, a facility, a store or others displayed via other applications. When the departure and destination points are set in this manner, the map application unit 140 can use any appropriate navigation method to determine a route for the setup departure and destination points.

At step S205, the autonomous navigation calculation unit 180 acquires sensor information measured by the autonomous navigation measurement unit 160.

At step S207, the autonomous navigation calculation unit 180 calculates the current position of the mobile terminal 100 based on the acquired sensor information and provides the map application unit 140 with the calculated current position. The map application unit 140 uses any appropriate map matching method to determine whether the received current position is to be map matched onto the setup route. For example, the map application unit 140 determines whether the received current position deviates from the setup route by greater than or equal to a predefined distance and if the received current position deviates by greater than or equal to the predefined distance, performs the map matching so that the current position of the mobile terminal can be located on the shortest point on the setup route from the received current position. After correcting the current position, the map application unit 140 transmits the post-corrected current position to the autonomous navigation calculation unit 180. Upon receiving the post-corrected current position from the map application unit 140, the autonomous navigation calculation unit 180 newly sets the post-corrected current position for subsequent use in position calculation or others.

At step S209, the autonomous navigation calculation unit 180 detects the user's straight walking state and corrects the current setup travelling direction in the mobile terminal 100 as well as corrects the current position based on the post-corrected travelling direction and the number of steps from the start time point in the straight walking state. Specific operations of step S209 are described with reference to FIG. 3 in detail below.

At step S211, the autonomous navigation calculation unit 180 determines whether the user has arrived at the destination point based on the calculated current position of the mobile terminal 100. If it is determined that the user has arrived at the destination point (S211: YES), the autonomous navigation operation ends. On the other hand, if it is determined that the user has not arrived at the destination point yet (S211: NO), the flow returns to step S205, and the autonomous navigation operation continues.

Figure 3:
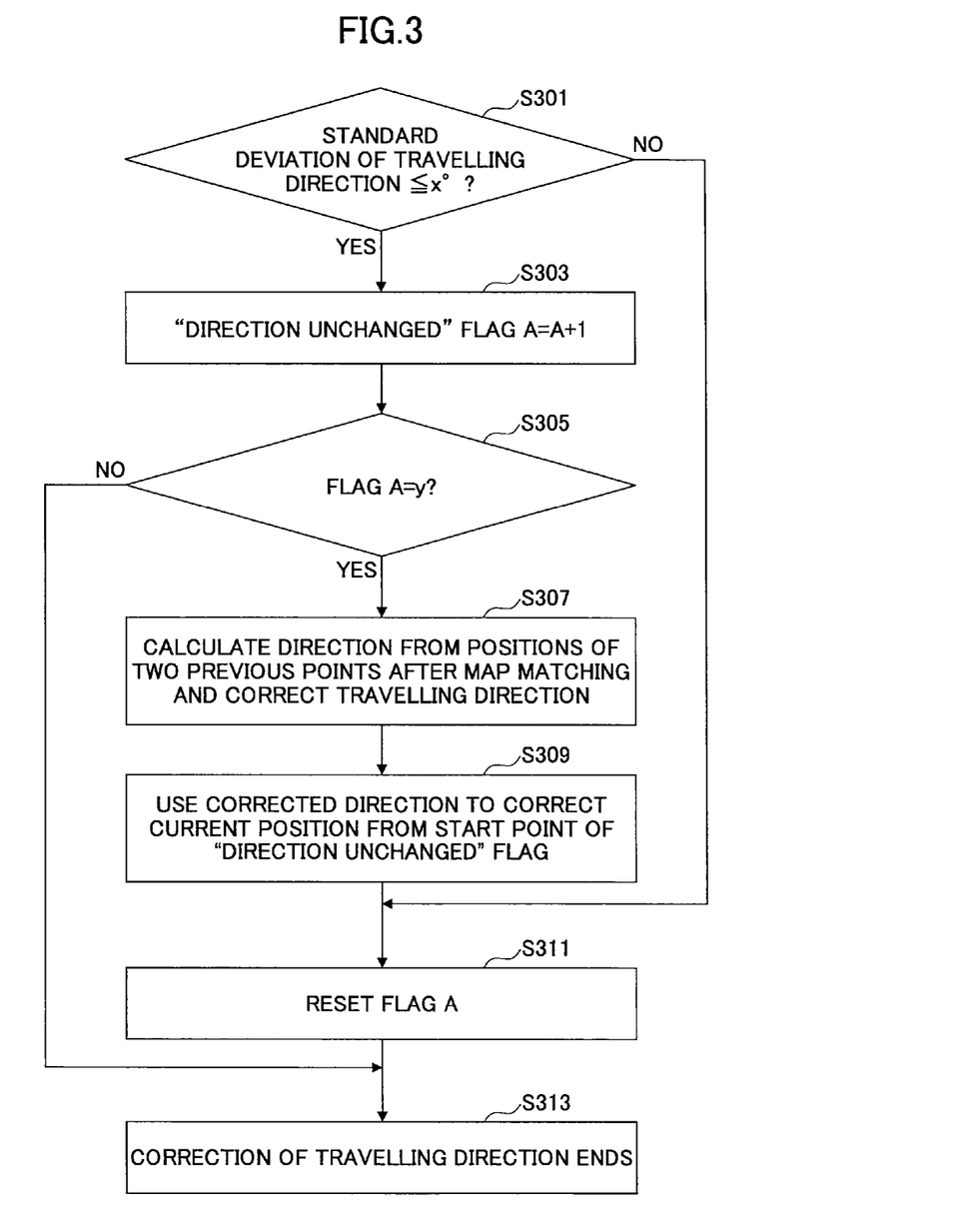
FIG. 3 is a flowchart illustrating a travelling direction correction operation according to one embodiment of the present invention.

Next, the travelling direction correction operation by the autonomous navigation calculation unit 180 at step S209 according to one embodiment of the present invention is described with reference to FIG. 3 in detail. FIG. 3 is a flowchart illustrating a travelling direction correction operation according to one embodiment of the present invention.

As illustrated in FIG. 3, at step S301, the travelling direction correction unit 184 periodically acquires the measured travelling direction of the user from the autonomous navigation measurement unit 160 and calculates the standard deviation of measurement values of the travelling direction measured for a predefined time period. The travelling direction correction unit 184 determines whether the calculated standard deviation is less than or equal to a predefined angle x degrees. If the calculated standard deviation is less than or equal to the x degrees (S301: YES), the travelling direction correction unit 184 determines that the user is walking in a constant direction, and the flow proceeds to step S303. On the other hand, if the calculated standard deviation is greater than the x degrees (S301: NO), the travelling direction correction unit 184 does not determine that the user is walking in the constant direction, and the flow proceeds to step S311. If the measurement values of the travelling direction acquired for the predefined time period are approximately constant, the calculated standard deviation would be equal to 0. Accordingly, the value x is set to a value close to 0 to determine that the user is walking in the constant direction.

At step S303, the travelling direction correction unit 184 increments flag A indicating that the travelling direction remains unchanged by 1. In this embodiment, a state where user's travelling direction remains unchanged for a certain time period is defined as the straight walking state, and the flag is used as a counter for counting temporal passage in a certain time period.

At step S305, the travelling direction correction unit 184 determines whether the incremented flag A is equal to a predefined threshold y. The value y is used to determine whether the user has walked without changing the travelling direction for a certain time period and is set to any appropriate value. If the flag A has not reached the threshold y, the travelling direction correction unit 184 determines that the user is walking in a constant direction but has not yet walked straight for such a time period that the user can be determined to be in the straight walking state, and the flow proceeds to step S313 and further proceeds to step S211 without correcting the travelling direction. On the other hand, if the flag A has reached the threshold y, the travelling direction correction unit 184 estimates that the user has entered the straight walking state, and the flow proceeds to step S307.

At step S307, since the user has entered the straight walking state, the travelling direction correction unit 184 estimates that the user is in a straight portion of the setup route. The travelling direction correction unit 184 corrects the current setup travelling direction with the direction of the straight portion of the map information of the map application unit 140. Specifically, the travelling direction correction unit 184 extracts two points map-matched previously onto the straight portion by the map application unit 140 and calculates the direction of the straight portion from respective positions of the two points. Then, the travelling direction correction unit 184 corrects the travelling direction currently setup in the autonomous navigation calculation unit 180 with the calculated direction and indicates the post-corrected travelling direction as well as the start point and the start time point of the straight walking state to the current position correction unit 186. The start time point of the straight walking state corresponds to the start time point of increments of flag A, and the start point of the straight walking state corresponds to the position of the mobile terminal 100 at the start time point of increments of flag A. The start point of the straight walking state may be stored by the travelling direction correction unit 184 acquiring the position of the mobile terminal 100 from the position calculation unit 182 at the increment start time point. Alternatively, the increment start time point may be indicated to the position calculation unit 182 after correction of the travelling direction, and the corresponding position of the mobile terminal 100 may be acquired from the position calculation unit 182.

At step S309, the current position correction unit 186 corrects the current position from the start point of the straight walking state based on the start point of the straight walking state and the post-corrected travelling direction received from the travelling direction correction unit 184. Specifically, the current position correction unit 186 calculates a movement amount from the start time point of the straight walking state from the current time point based on the post-corrected travelling direction and the number of steps from the start time point of the straight walking state to the current time point and corrects the current position by adding the movement amount to the position associated with the start point of the straight walking state. After correcting the current position, the current position correction unit 186 indicates the post-corrected current position to the position calculation unit 182, and the position calculation unit 182 uses the post-corrected current position as a reference point for subsequent position calculation.

At step S311, the travelling direction correction unit 184 resets flag A, and the travelling direction correction operation ends at step S313.

In the above embodiment, it is estimated that if the travelling direction of the user remains unchanged for a certain time period, the user is in the straight walking state. However, the present invention is not limited to it. In other embodiments, there is a case where the user stops and is not walking, and as a result, the travelling direction may remain unchanged for a certain time period. Accordingly, a variation of the number of steps together with the variation of the travelling direction may be taken into account. Specifically, it is determined that the user has walked for longer than or equal to a certain time period or by greater than or equal to a certain distance, that is, that the user is in a walking state, and it may be determined whether the travelling direction has been unchanged for a certain time period in the walking state.

Also, in the above embodiment, the standard deviation of measurement values of the travelling direction is used to determine whether the user is walking approximately straight, but the present invention is not limited to it. Any appropriate indicator indicative of the trend of the travelling direction of the user for a certain time period may be used.

Although the embodiments of the present invention have been described in detail, the present invention is not limited to the above-stated specific embodiments and can be changed and modified within the scope of the present invention defined in the claims.

This international patent application is based on Japanese Priority Application No. 2010-269610 filed on Dec. 2, 2010, the entire contents of which are hereby incorporated by reference.

LIST OF REFERENCE SYMBOLS

100: mobile terminal
120: user interface unit
140: map application unit
160: autonomous navigation measurement unit
180: autonomous navigation calculation unit
182: position calculation unit
184: travelling direction correction unit
186: current position correction unit

The invention claimed is:

1. A mobile terminal having an autonomous navigation function, comprising:
   circuitry configured to
      perform map matching of a current position of the mobile terminal onto a route from a departure point to a destination point of a user of the mobile terminal in map information;
      detect movement of the mobile terminal and provide sensor information indicative of a number of steps and a travelling direction of the user;
      determine the current position of the mobile terminal based on the number of steps and the travelling direction of the user in the sensor information;
      estimate whether the user is in a straight walking state by determining whether a change amount of the travelling direction of the user in the sensor information is within a predefined range for a predefined time period;

compare, if it is estimated that the user is in the straight walking state, the travelling direction correction unit of the user with a direction of a corresponding straight portion of the route in the map information from the departure point to the destination point of the user in the straight walking state;

correct the travelling direction of the user based on the comparison;

recalculate the current position of the mobile terminal from a start point based on the corrected travelling direction as well as a start time point and the start point of the straight walking state; and correct the current position of the mobile terminal with the recalculated current position.

2. The mobile terminal as claimed in claim 1, wherein when the current position of the mobile terminal deviates from the route by a predefined distance, the circuitry is configured to perform the map matching by matching the current position of the mobile terminal onto the route.

3. The mobile terminal as claimed in claim 2, wherein when it is estimated that the user is in the straight walking state, the circuitry is configured to calculate a direction between two points map-matched previously onto the straight portion of the route and correct the travelling direction of the user with the calculated direction.

4. The mobile terminal as claimed in claim 1, wherein the circuitry is configured to estimate whether the user is in the straight walking state by determining whether a standard deviation of measurement values of the travelling direction of the user for the predefined time period is less than or equal to a predefined threshold.

5. The mobile terminal as claimed in claim 1, wherein the circuitry is configured to estimate whether the user is in the straight walking state by determining whether a change amount of the travelling direction of the user in the sensor information is within a predefined range for a predefined time period as well as determining whether the user has walked by greater than or equal to a predefined distance for the predefined time period based on the number of steps of the user in the sensor information.

6. The mobile terminal as claimed in claim 1, wherein the circuitry is configured to recalculate the current position of the mobile terminal from the start point by calculating a movement amount of the mobile terminal from the start time point to a current time point based on the number of steps of the user from the start time point to the current time point and the corrected travelling direction and adding the calculated movement amount to the start point.

7. A system, comprising:
a mobile terminal having an autonomous navigation function; and
a server communicatively connected to the mobile terminal,
the server performing map matching of a current position of the mobile terminal onto a route from a departure point to a destination point of a user of the mobile terminal in map information and indicating the position map-matched onto the route to the mobile terminal,
the mobile terminal comprising:
circuitry configured to
detect movement of the mobile terminal and provide sensor information indicative of a number of steps and a travelling direction of the user;
determine the current position of the mobile terminal based on the number of steps and the travelling direction of the user in the sensor information;
estimate whether the user is in a straight walking state by determining whether a change amount of the travelling direction of the user in the sensor information is within a predefined range for a predefined time period;
compare, if it is estimated that the user is in the straight walking state, the travelling direction of the user with a direction of a corresponding straight portion of the route in the map information from the departure point to the destination point of the user in the straight walking state;
correct the travelling direction of the user based on the comparison;
recalculate the current position of the mobile terminal from a start point based on the corrected travelling direction as well as a start time point and the start point of the straight walking state; and
correct the current position of the mobile terminal with the recalculated current position.

8. A method for use in a mobile terminal having an autonomous navigation function, comprising:
performing map matching of a current position of the mobile terminal onto a route from a departure point to a destination point of a user of the mobile terminal in map information;
detecting movement of the mobile terminal and providing sensor information indicative of a number of steps and a travelling direction of the user;
determining the current position of the mobile terminal based on the number of steps and the travelling direction of the user in the sensor information;
estimating whether the user is in a straight walking state by determining whether a change amount of the travelling direction of the user in the sensor information is within a predefined range for a predefined time period;
comparing, if it is estimated that the user is in the straight walking state, the travelling direction of the user with a direction of a corresponding straight portion of the route in the map information from the departure point to the destination point of the user in the straight walking state;
correcting the travelling direction of the user based on the comparison;
recalculating the current position of the mobile terminal from a start point based on the corrected travelling direction as well as a start time point and the start point of the straight walking state; and
correcting the current position of the mobile terminal with the recalculated current position.

* * * * *